(12) United States Patent
Hylden et al.

(10) Patent No.: US 6,799,080 B1
(45) Date of Patent: Sep. 28, 2004

(54) CONFIGURABLE PLC AND SCADA-BASED CONTROL SYSTEM

(75) Inventors: Mark W. Hylden, Minneapolis, MN (US); Brad Alan Alexander, Wayzata, MN (US); Christopher Allen Wichman, Edina, MN (US); Wesley D. LaFortune, Mound, MN (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/460,794

(22) Filed: Jun. 12, 2003

(51) Int. Cl.[7] .............................................. G06F 19/00
(52) U.S. Cl. .............................. 700/97; 700/9; 700/83; 340/3.1
(58) Field of Search ............................... 700/6, 79, 83, 700/90, 282; 340/3.1, 3.9; 702/127; 709/223

(56) References Cited

U.S. PATENT DOCUMENTS

| | | | |
|---|---|---|---|
| 5,396,416 A | * | 3/1995 | Berkowitz et al. ............ 700/45 |
| 5,504,693 A | * | 4/1996 | Elliott et al. ................. 700/282 |
| 6,411,987 B1 | * | 6/2002 | Steger et al. ................. 709/203 |
| 6,505,247 B1 | * | 1/2003 | Steger et al. ................. 709/224 |
| 6,643,555 B1 | * | 11/2003 | Eller et al. .................... 700/83 |
| 2003/0220717 A1 | * | 11/2003 | Underwood et al. ........ 700/282 |

* cited by examiner

Primary Examiner—Jayprakash N. Gandhi
(74) Attorney, Agent, or Firm—David A. Hey

(57) ABSTRACT

The present invention provides an automated configurable control system (CCS) for a manufacturing process system, which permits a user to address menus on screen images for initially configuring the process, and for subsequently rapidly adding, modifying, and deleting components and control signals, without revising software programs. The control system utilizes a configuration tool for automatically providing a configuration database file from data inputted by a user into the CCS. A deployment tool automatically downloads the configuration database file to a SCADA application responsive thereto for defining the system, monitoring the status of the processing system, and displaying screen images. The deployment tool also provides the data via a download application to a PLC application for defining the objects and logic of the processing system.

20 Claims, 20 Drawing Sheets

CONFIGURABLE PLC AND SCADA-BASED CONTROL SYSTEM

FIELD OF THE INVENTION

The present invention relates generally to systems which control and monitor manufacturing processes, and more particularly to such systems that can be configured with minimal modification of software.

BACKGROUND OF THE INVENTION

Present manufacturing monitoring and control systems permit the addition of objects or components to the processing system being monitored and controlled, but such addition of objects or components is made within a fixed logical and/or input/output (IO) configuration. A user must modify the software in the monitoring and control system in order to operate outside the fixed configuration provided. In order to do so, typically a skilled software engineer is required, and the coding required is usually very complicated, tedious, and difficult to debug. Accordingly, to overcome the problems in the prior art, there is a long-felt need for developing monitoring and control systems for manufacturing processes that are flexible in permitting a user easy object definition in configuring various tools and devices that have distinct attributes and logic. Also, there is a need in such systems for permitting a user to easily assign input/output (IO) in any desired location within the manufacturing process, to have the ability to easily update the system configuration, and to accomplish the monitoring and control functions with a minimum of manual addressing of the computerized control system, all without requiring the user to have any programming skills.

The manufacturing of electronic devices, such as solid-state or integrated circuit devices, relies upon the use of chemicals that in state-of-the art systems are delivered through automated distribution networks. Such processing systems also typically include pumps, blenders, extensive piping, valve boxes, and so forth, all of which require control mechanisms and systems for the safe and timely delivery of the various chemicals to their associated points of use. Presently used control systems typically rely on commercially available or proprietary control hardware systems that are programmed through use of customized or at least partially customized software. These known systems require that the software be modified in order to accommodate any changes in the chemical system, and typically require the services of a highly-skilled software engineer. As a result, such systems are limited in their flexibility, and require extensive time to institute changes to the system, which in turn increases cost due to downtime, and reliance on additional personnel.

SUMMARY OF THE INVENTION

With the problems of the prior art in mind, the present invention provides a Configurable Control System (CCS) that is computerized for performing control and monitoring of industrial processes, and permits rapid deployment and modification through use of means for configuring the system without requiring any software or programming modification. Note that although the present invention is described for use in the control and monitoring of the delivery of chemicals, operation of tools, valve boxes, and other devices, in chemical systems associated with the manufacture or fabrication of electronic devices, the present invention is not so limited, and can be applied for use in other manufacturing environments.

The present invention includes means for permitting a manufacturing system to be easily configured, to add or delete tools, valve boxes, modify distribution of chemicals, and delete or add points of use, while substantially eliminating downtime of the associated chemical system or manufacturing process. In one embodiment of the invention a Configurable Control System (CCS) includes a three-component software application, the first software component being a configuration tool, the second component being a CCS Supervisory Control and Data Acquisition (SCADA) application, and the third being a CCS PLC (Programmable Logic Controller) application.

The configuration tool component, in a preferred embodiment includes a form based graphical user interface (GUI) to permit a user to define the physical and logical configuration of the manufacturing or processing system, such as a chemical system.

The SCADA software component provides means for downloading the configuration file from the Configuration Tool to a chemical monitoring system (CMS) and programmable logic computer (PLC) application. The SCADA application also deploys changes and auto-generates graphics and alarms based on the system defined through the configuration tool.

The third software component is a CCS PLC application that uses the configuration file to define the objects and logic of the manufacturing or processing system, by assigning input/outputs (IO), and logic based on the system as define via the configuration tool.

The various embodiments of the present invention when used in a chemical processing system, for example, provides "plug and play" means for permitting a user to readily add or remove tools, add or remove valve boxes, add or remove IO controllers, add or remove equipment controllers, change the distribution of chemicals, modify control signals, and so forth, all without requiring software modifications.

BRIEF DESCRIPTION OF THE DRAWINGS

Various embodiments of the present invention are described below with reference to the drawings, in which like items are indicated by the same reference designation, wherein.

DETAILED DESCRIPTION OF THE INVENTION

The present invention provides a Configurable Control System (CCS) for permitting users of a manufacturing process system to both configure and reconfigure their system without changing the system software. Operation of the various embodiments of the present invention are illustrated in association with a chemical processing system typically used by solid-state device or semiconductor manufacturers, for permitting such users to quickly add, modify, delete components, and change control signals in the associated processing system in accordance with desired changes in the associated chemical delivery network, all without requiring changes in the software. Typically, the various embodiments of the invention permit such changes to be made in the control system without requiring downtime in operating the chemical processing system.

Figure 1:
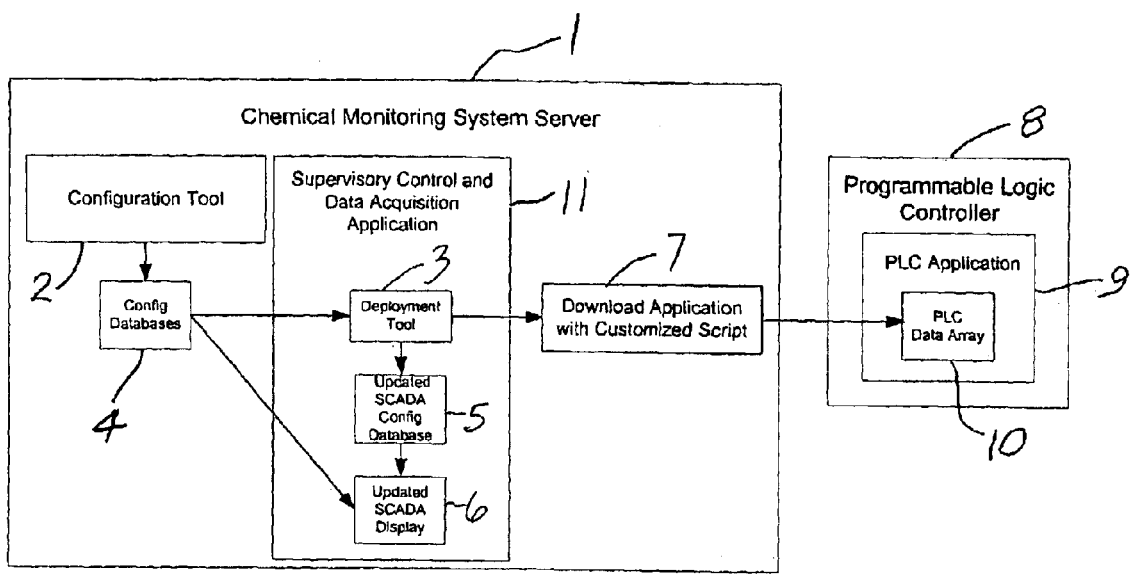
FIG. 1 is a block schematic diagram showing one embodiment of the present invention.

With reference to FIG. 1, in one embodiment of the invention, the Configurable Control System (CCS) of the present invention includes a chemical monitoring server 1 (CMS server), and a programmable logic controller 8 (PLC). The CMS server 1 is typically a personal computer, which is loaded with a database and graphical user interface software program, and a Supervisory Control And Data Acquisition (SCADA) application 11 software program. A user enters configuration information into a forms based graphical user interface (GUI) displayed as screen images on a computer monitor (not shown), whereby the data is entered into the configuration tool 2. The configuration tool 2 automatically generates configuration databases in a database file 4 containing data tables. The CCS also includes a programmable logic controller (PLC) 8 that is programmed via a PLC application 9. Note that the configuration databases 4 include a database for each of the SCADA application 11, and PLC application 9. The CMS server 1 deploys changes and auto-generates graphics and alarms based on the processing system as defined through the configuration tool 2. The PLC application 9 assigns 10 and logic based on the process system defined through the configuration tool 2 via the established configuration data file 4.

After entering information into the configuration tool 2, for use of screen images, a user then opens the SCADA software program, followed by opening a deployment tool 3 from the SCADA application 11 software main page. Through the use of screen images providing the user interface relative to the deployment tool 3, a user can then proceed to update a SCADA configuration database 5, and a PLC data array or database 10. As shown further in FIG. 1, a download application with customized script 7 is utilized for downloading the database from the deployment tool 3 to the PLC data array 10.

The deployment tool 3 updates the SCADA configuration database 5 with any changes made by the user via the configuration tool 2. The SCADA application 11 automatically responds by updating the SCADA display software 6 based upon the updated SCADA configuration database 5. The deployment tool 3 also downloads the PLC configuration data from database 4 to the PLC 8, as previously described. In a preferred embodiment of the invention, the PLC 8 is provided by an Allen-Bradley Control Logix Processor. A standard driver such as a Rockwell Automation RSLinx is used for converting the configuration information in the PLC database 10 into an array format that can be read by the PLC 8.

Note that the SCADA application 11, download application 7, and the application for configuration tool 2 and its database 4 do not have to be loaded onto the same PC. The personal computer providing the CMS server 1 also represents a programmable Human Machine Interface (HMI), or Man Machine Interface (MMI). Also it is important to note in the present invention, as previously mentioned, that the configuration databases 4 and GUI program are used for creating the databases for both the SCADA application 11, and PLC application 9. The construction of the PLC data array 10 enables the RSLinx to efficiently download data from the deployment tool 3 to the PLC 8.

As described below, the use of graphical user interfaces permit a user to define the physical and logical configuration of a manufacturing process system, for example that consists of a plurality of interconnected devices, tools, controllers, and so forth. For purposes of illustration, use of the present invention is described in association with a chemical processing system, typical of those that are used in the fabrication of semiconductor devices. Such a chemical system typically includes chemical distribution modules, blending modules, collection modules, valve boxes, programmable logic controllers, field IO panels, process tools, piping to carry and deliver various chemicals from supply to use points, interface panels, computer displays, tanks for holding various chemical products, and so forth. The configuration tool 2 can be programmed in a variety of software development environments and languages including Web-based languages for providing the desired functionality provided by the present invention. In the preferred embodiment, the configuration tool 2 is a Microsoft Access based-software application, provided by Microsoft Corporation.

The configuration database 4 created by the configuration tool 2, in the preferred embodiment is a Microsoft Access based software for describing the configuration of the associated manufacturing process system, in this example, a chemical system. The configuration database file 4 contains variables that are shown below for the illustrated system that are read by SCADA application 11, and programmable logic controller (PLC) application 9. The configuration database file 4 can also be provided by other software, such as extensible markup language (XML) for communicating over computer networks.

The deployment tool 3 is a SCADA software application for downloading data from the configuration file 4 as previously described. In a preferred embodiment, the deployment tool 3 is based upon Cimplicity software provided by General Electric Corporation. The SCADA application 11, in the preferred embodiment is also GE Cimplicity-based software.

The CMS server 1 is programmed to monitor the status of the associated system, and provides the primary human/machine interface for users or operators of the associated processing system. The SCADA application 11 can be developed for any manufacturing process system applicable for use with the present invention.

The PLC application 9 is a software application that receives data from the configuration file 4 for defining the objects and logic of the associated system, the chemical system in this example. In the preferred embodiment, Allen-Bradley software (provided by Allen-Bradley Corporation) is used for programming the associated Allen-Bradley programmable logic controller(s) 8.

Figure 2:
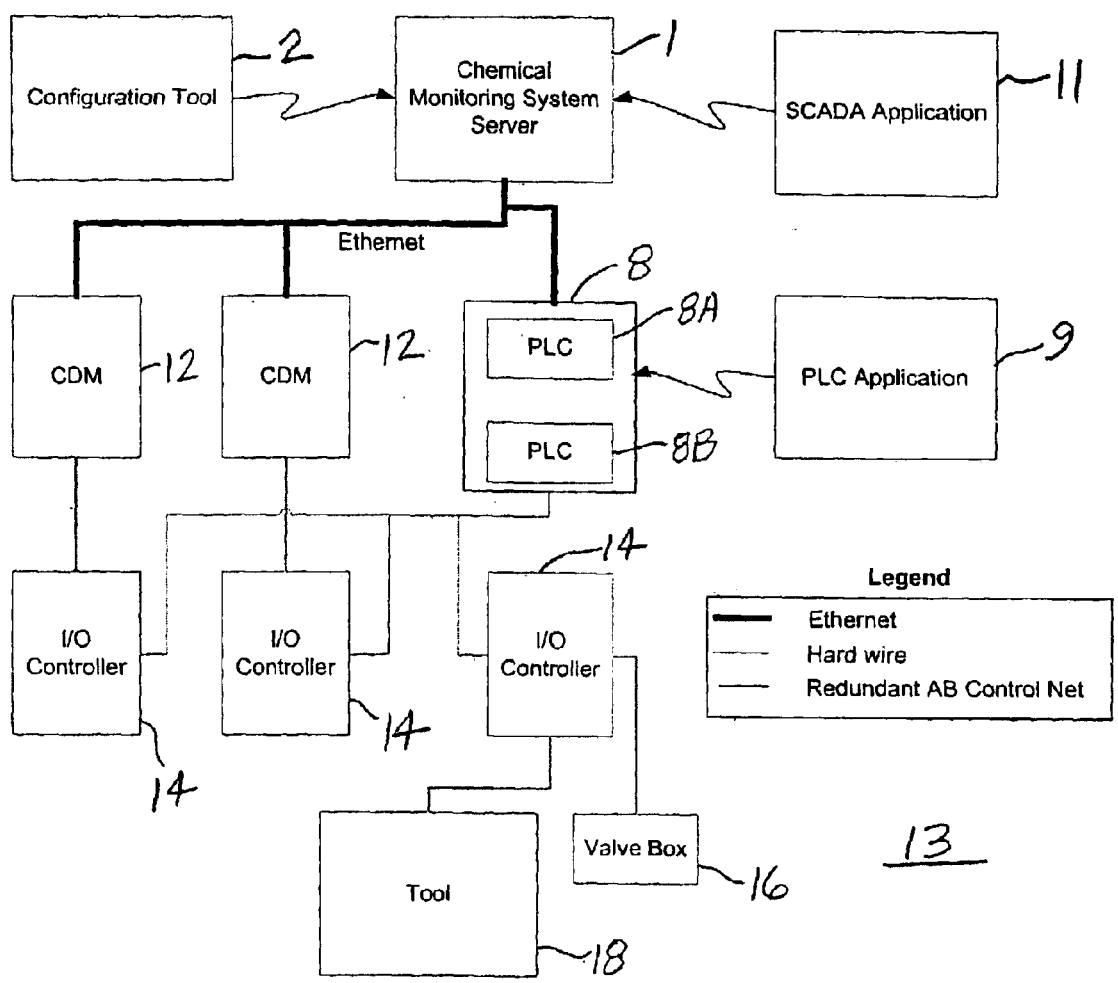
FIG. 2 is a block schematic diagram showing an example of a manufacturing process system including the present invention.

With reference to FIG. 2, various embodiments of the invention are shown for use in a chemical processing system or network 13. Note that although various embodiments of the present invention are illustrated for use in a chemical processing system, as previously mentioned, the present invention is not so limited and can be used in other than chemical processing systems. As shown, the chemical processing system includes the CCS configuration tool 2, CMS server 1, and a single or redundant PLC 8 (shown redundantly with PLCs 8A and 8B), and other elements of the present invention as previously described. Also, SCADA application program 11 is used for programming the CMS server 1. PLC application program 9 is utilized for the PLC 8.

The illustrative components of the chemical processing system also include chemical distribution modules 12, IO controllers 14, a tool 18, and valve box 16. The network design substantially eliminates downtime by permitting the addition of dispenser and blender modules, for example, without interrupting operation of the existing system. A redundant PLC controller 8, also known as a data concentrator, controls the distribution system. The controllers 14 are jointly operative for managing the signals and logic required to safely deliver chemical products to the processing tool 18, in this example. The SCADA application 11 provides monitoring only, and is not associated with controlling the delivery of chemical products.

Figure 3:
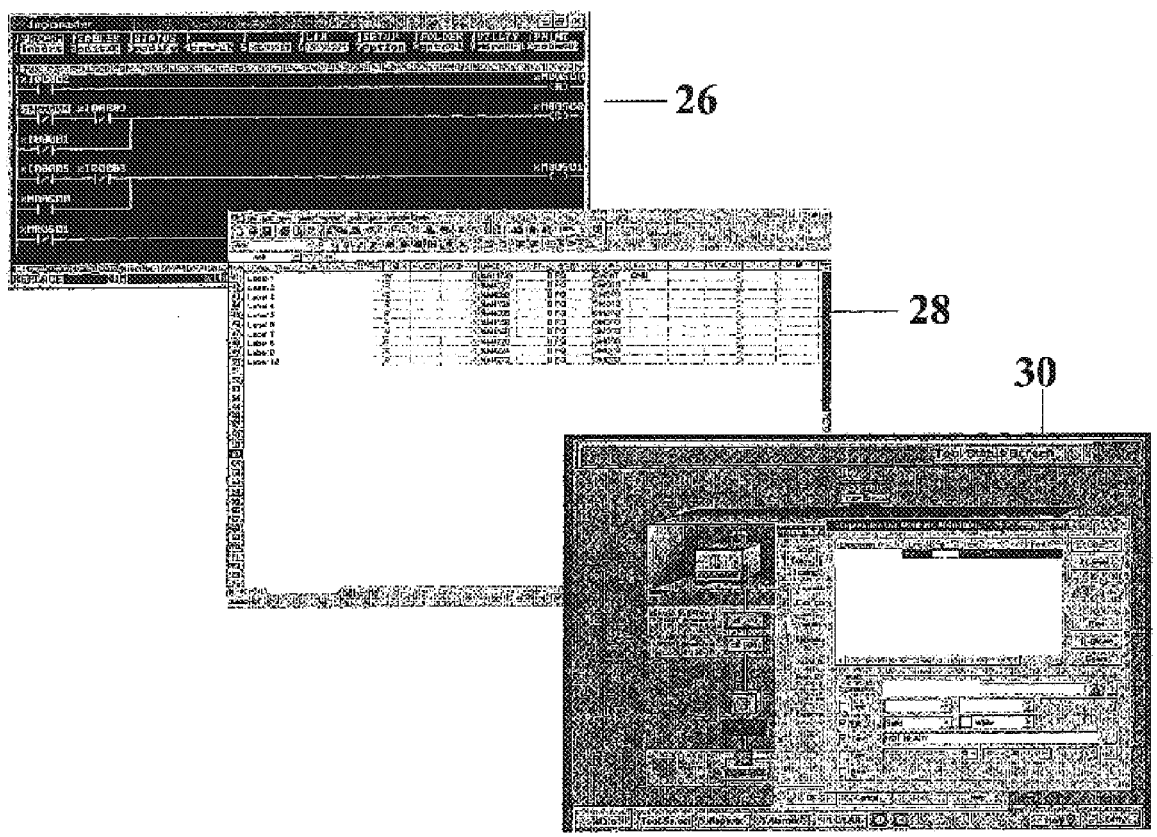
FIG. 3 is an example of typical screen images required in a prior art system for configuring or changing the processing or manufacturing system.

As shown in FIG. 3, typical prior chemical processing systems, as well as non-chemical processing systems, require tedious coding that must be provided by a skilled software engineer in order to both initially configure the system, and to subsequently make changes to the system. Screen images 26, 28, and 30 are required for configuring and making changes to the system, with screen image 26 showing the extensive coding that typically must be dealt with.

Through use of the various embodiments of the present invention, the tedious coding required in the prior art is substantially eliminated. For the chemical system 13 of FIG. 2, and other manufacturing systems, the CCS system of the present invention must be initialized prior to use.

Figure 4:
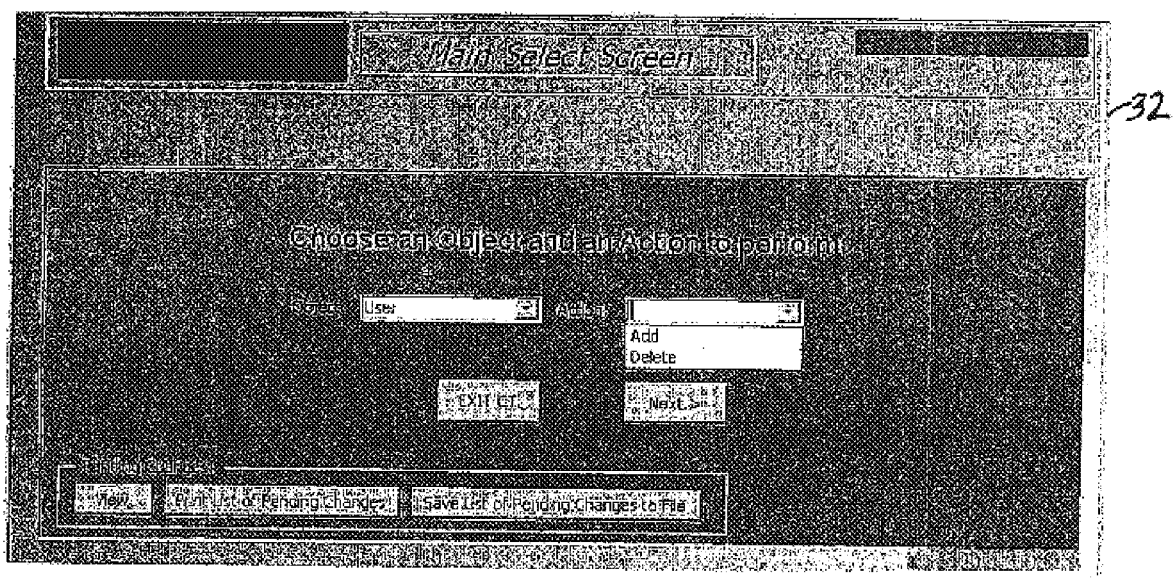
FIGS. 4 through 11 show screen images for various embodiments of the invention for initially configuring a chemical processing system as an example of one use of the present invention.
Figure 5:
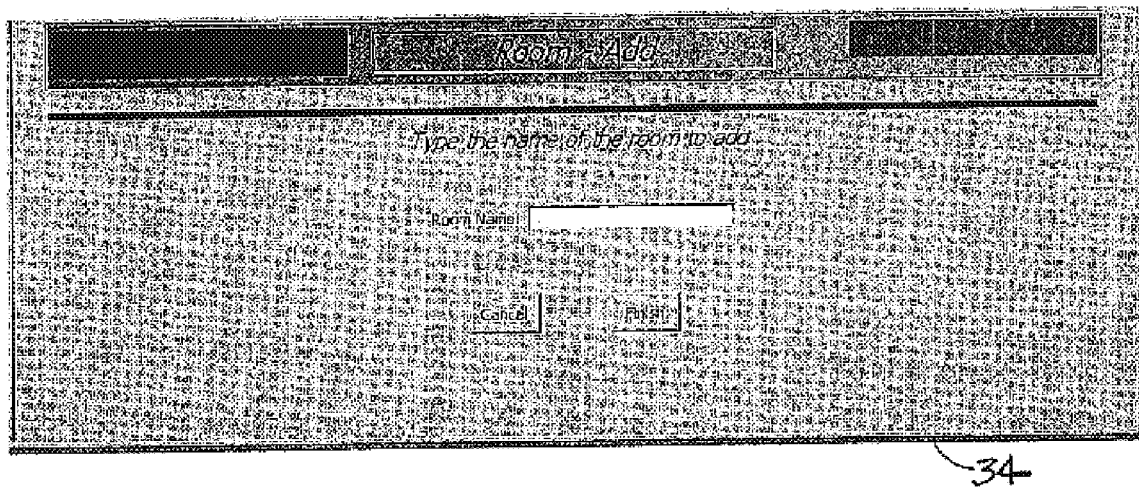

The advantages of the use of the present invention will now be illustrated. With reference to FIG. 4, to both initialize and subsequently make changes to the chemical system 13, a user operates a GUI, for example, for bringing up a Main Select Screen 32 as shown in FIG. 4. A user will first address the pull-down screen for the "Object," and in this example select "Room" from the Object Menu. Following this selection, the user then uses the pull-down menu for the "Action" entry, and in this example selects "Add" followed by selecting or pushing "Next." The user is then shown a Room Add Screen Image 34, as shown in FIG. 5. The user then types in the desired Room name, and presses finish.

Figure 6:
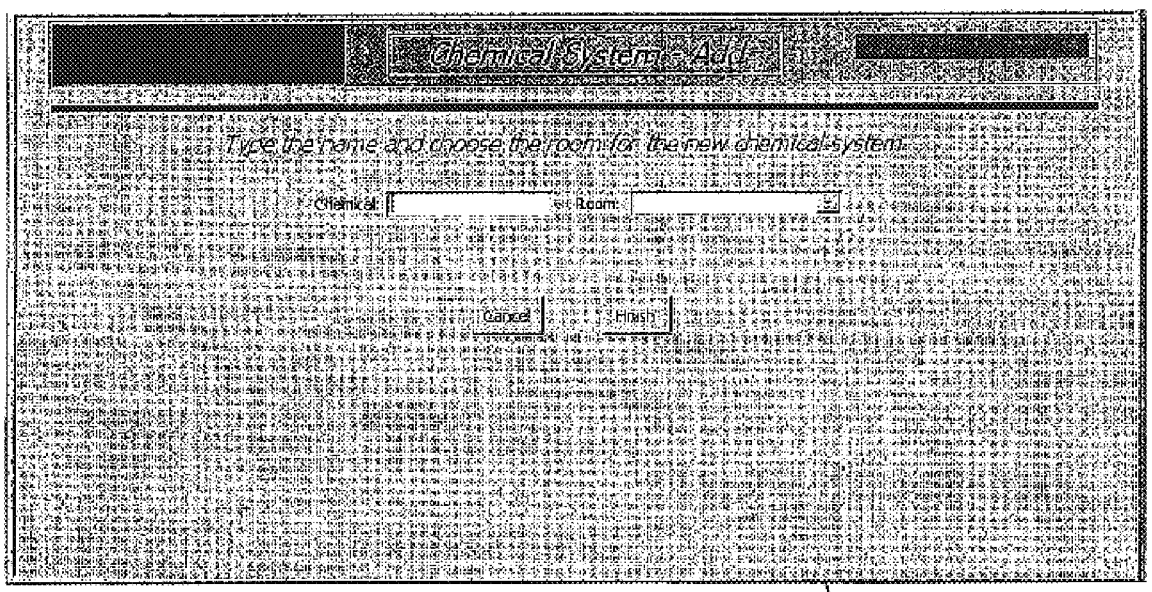

Continuing the initial configuration of the system, the user is next automatically presented the Main Select Screen 32 of FIG. 4. Upon presentation of the Main Select Screen 32, the user uses the pull-down menu from the "Object" and selects a desired chemical system. Following this, the user addresses the pull-down menu for "Action" and selects add, followed by selecting "Next." The present CCS responds by presenting the user with screen image 36 (see FIG. 6) for "Chemical System-Add." The user types in the desired chemical name, and chemical room, followed by pressing "Finish" (note that wherever press or pressing is indicated, this is typically accomplished by using an associated computer mouse or touch screen).

Figure 7:
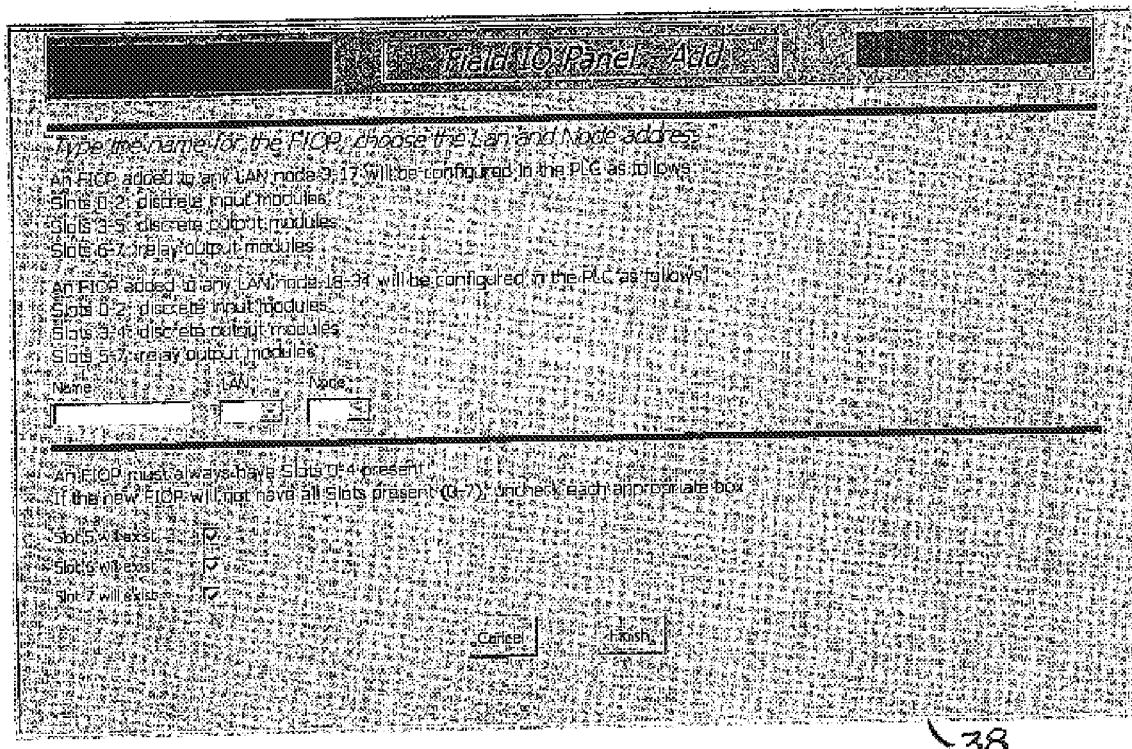

The CCS of the present invention automatically returns the user to the screen image 32 for the Main Select Screen (see FIG. 4). In this example, the user addresses the Object pull-down menu and selects FIOP (Field IO Panel), and from the Action pull-down selects Add followed by pressing Next. Next, the CCS responds by presenting the user with a screen image 38 (see FIG. 7) for Field IO Panel—Add. The user then types in a FIOP name, addresses a pull-down menu for selecting a LAN (Local Area Network), and uses a pull-down menu for selecting a "Node." After making these selections, the user then presses Finish. Next, the user is automatically returned back to the main select screen 32 of FIG. 4. The user addresses the pull-down menu for Object, and selects a desired CDM (Chemical Distribution Module), addresses the pull-down menu for Action, and selects Add, followed by pushing Next.

Figure 8:
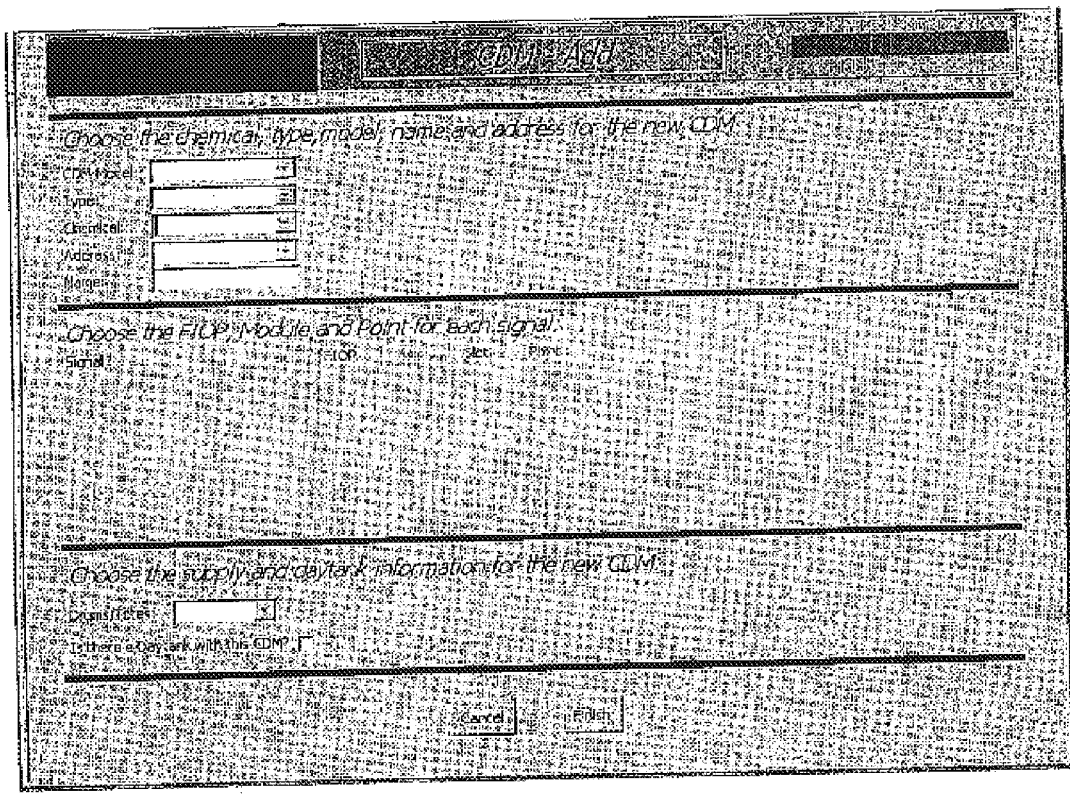

As shown in FIG. 8, the CCS provides screen image 40, CDM-Add, whereby the user addresses the associated pull-down menus for selecting a chemical, desired type of CDM 12 (Chemical Distribution Module), and IP address, followed by typing in the name for the selected CDM 12, and presses Finish. In response, the CCS displays pull-down menus for permitting the user to choose a desired type of Signal, an applicable FIOP, an appropriate Slot, and Point. The user must also use the pull-down menu to select or choose the supply and toggle information for the newly added CDM 12. After making this selection, the user presses Finish, and the CCS responds by displaying an Assign IO screen display permitting the user to choose a spare IO and press Finish.

Figure 9:
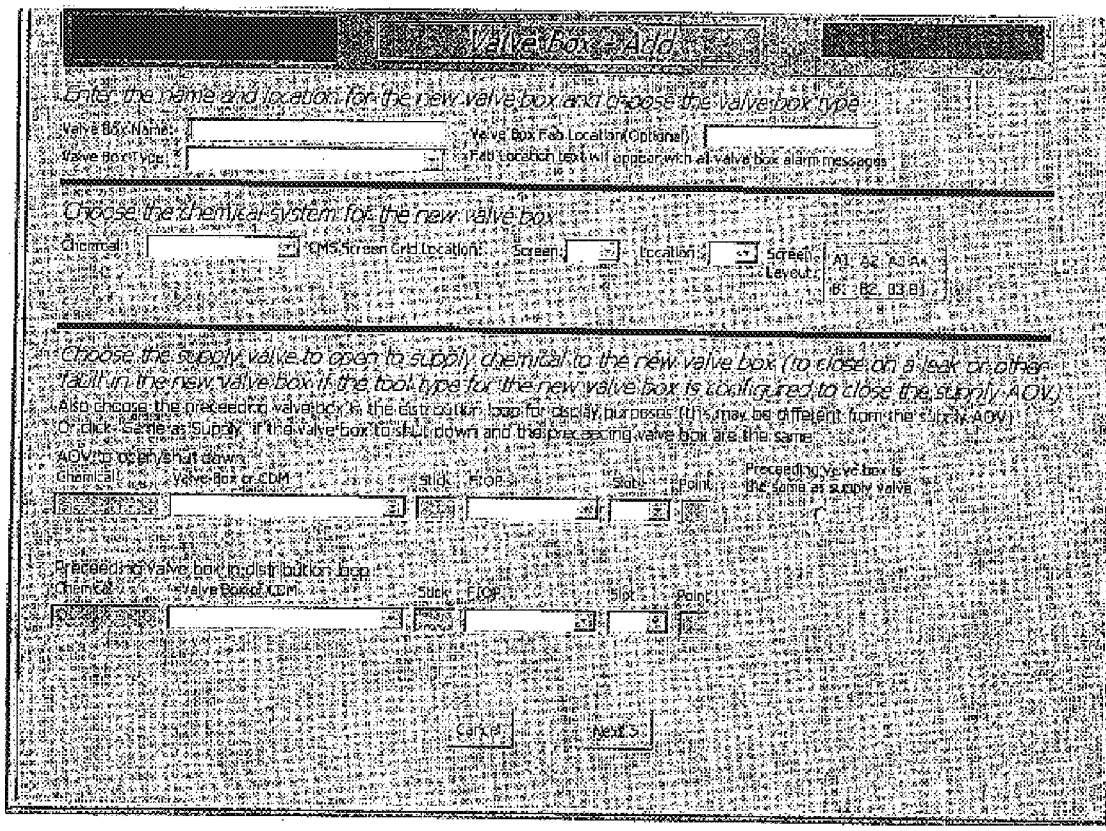
Figure 10:
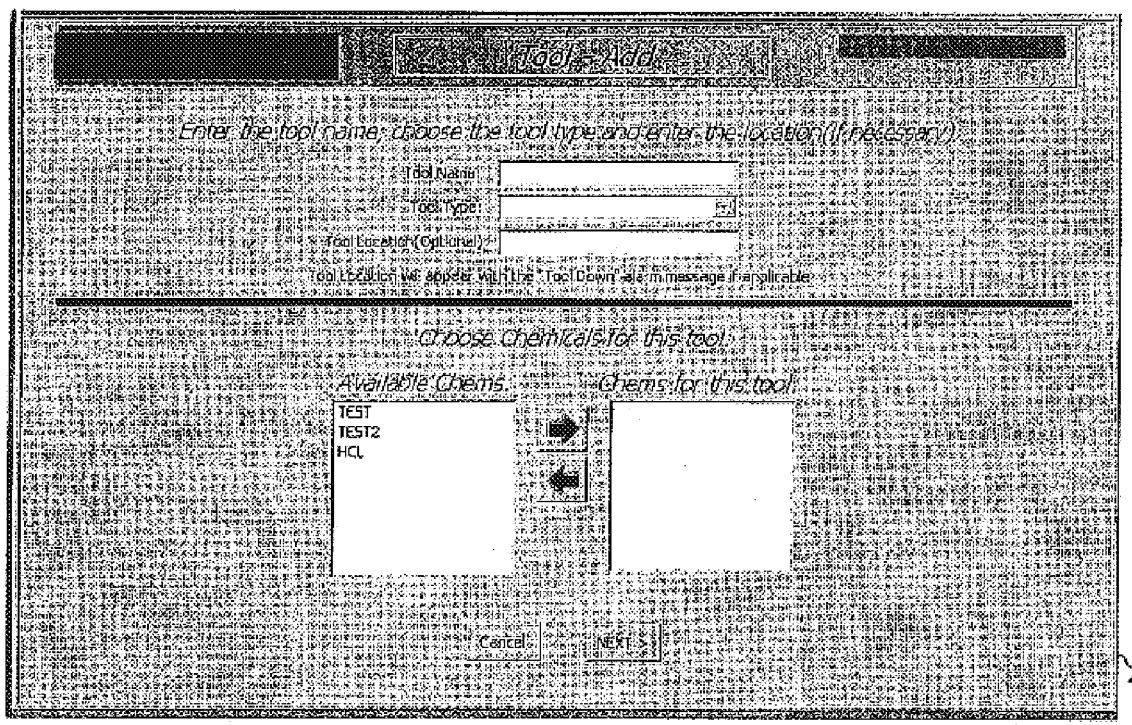

The CCS responds by automatically returning the display to the Main Select Screen 32 (see FIG. 4). The user then addresses the pull-down for Object to select a valve box, followed by an address and a pull-down menu for Action and selecting Add, followed by pressing Next. The CCS responds by displaying screen image 42 for Valve Box-Add (see FIG. 9). The user then enters data either by typing in the blank data fields or utilizing the associated pull-down menus where applicable, for providing all of the information, and then presses Next. The CCS responds by displaying screen image 44 for Tool-Add (see FIG. 10). The user then must type in the tool name in the appropriate data field, select the Tool Type from the associated pull-down menu in the data field, and optionally type in a Tool Location. The user must also press the appropriate arrow keys to move the chemicals to the "Chems" for the associated Toolbox, followed by pressing Next.

The user is next presented with a screen image for an IO Choice Screen (not shown), addresses the screen for choosing a spare IO, followed by the user pressing Finish. The CCS responds by displaying the Main Select Screen 32 of FIG. 4, whereby the user uses the appropriate pull-down menus for selecting a valve box from Object, selecting Add from Action, followed by pushing Next.

Figure 11:
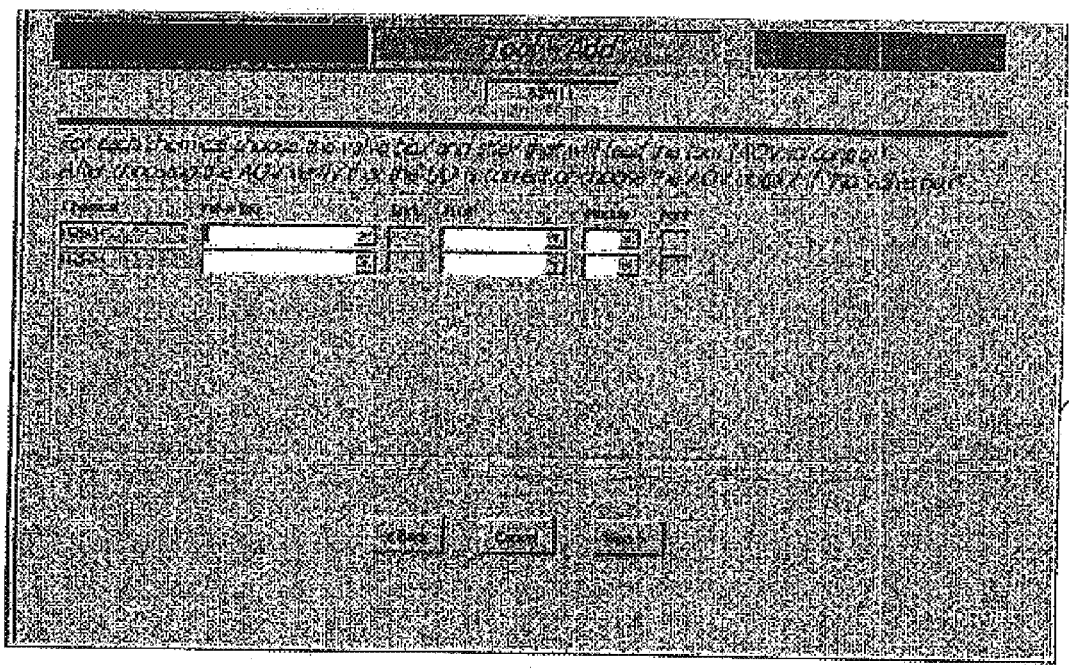

As shown in FIG. 11, the user is next presented with a screen image 46 to permit the user to select a valve box to feed a tool, the selection being made by filling in the blank fields utilizing associated pull-down menus. The CCS responds to the user pressing Next, by providing a new image screen (not shown) for permitting user to select a FIOP and module for a tool ready Signal.

This completes the initial configuration of the illustrative chemical system.

Figure 12:
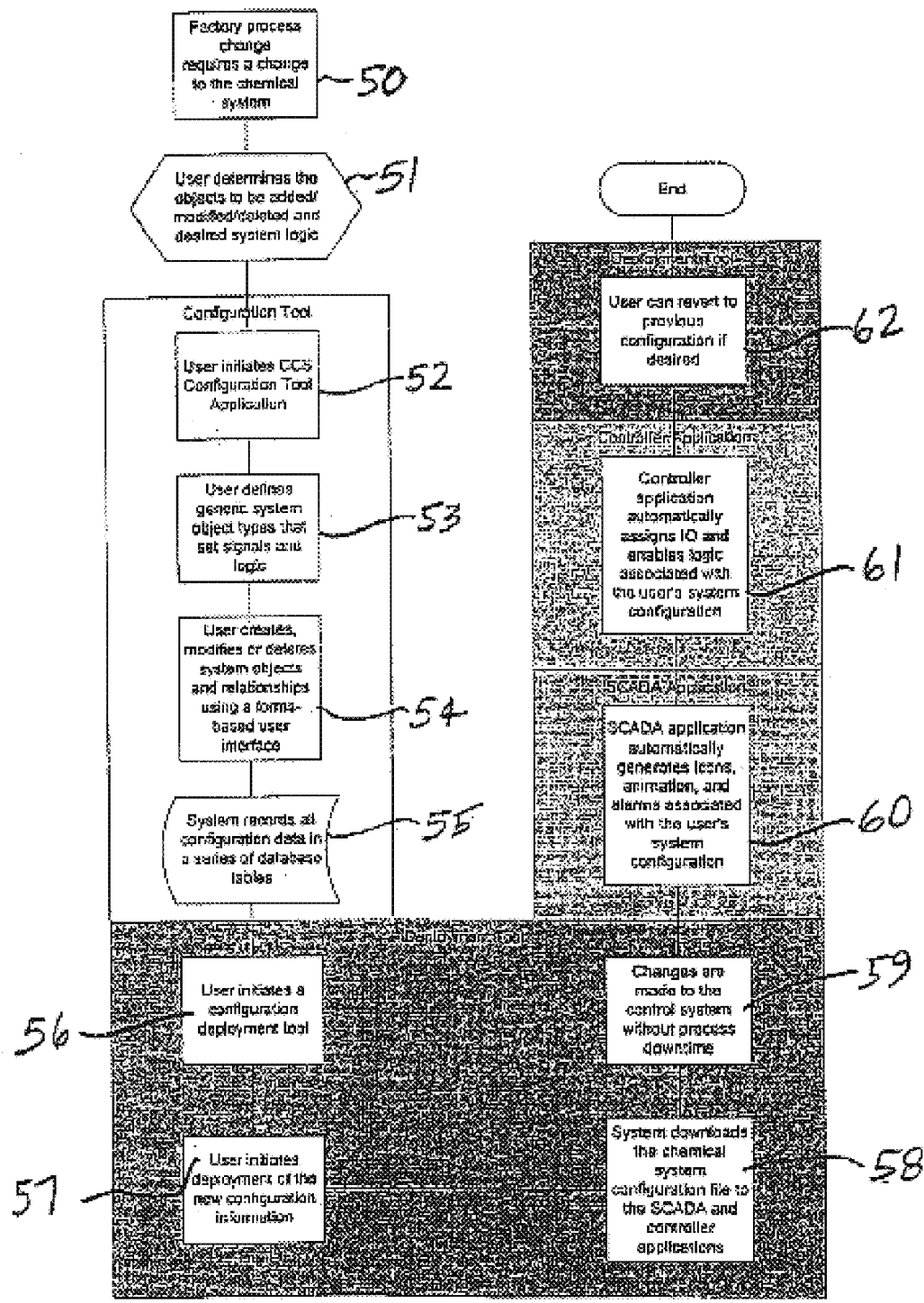
FIG. 12 shows a flowchart of a method for changing the configuration of the illustrative chemical system for an embodiment of the invention.
Figure 13:
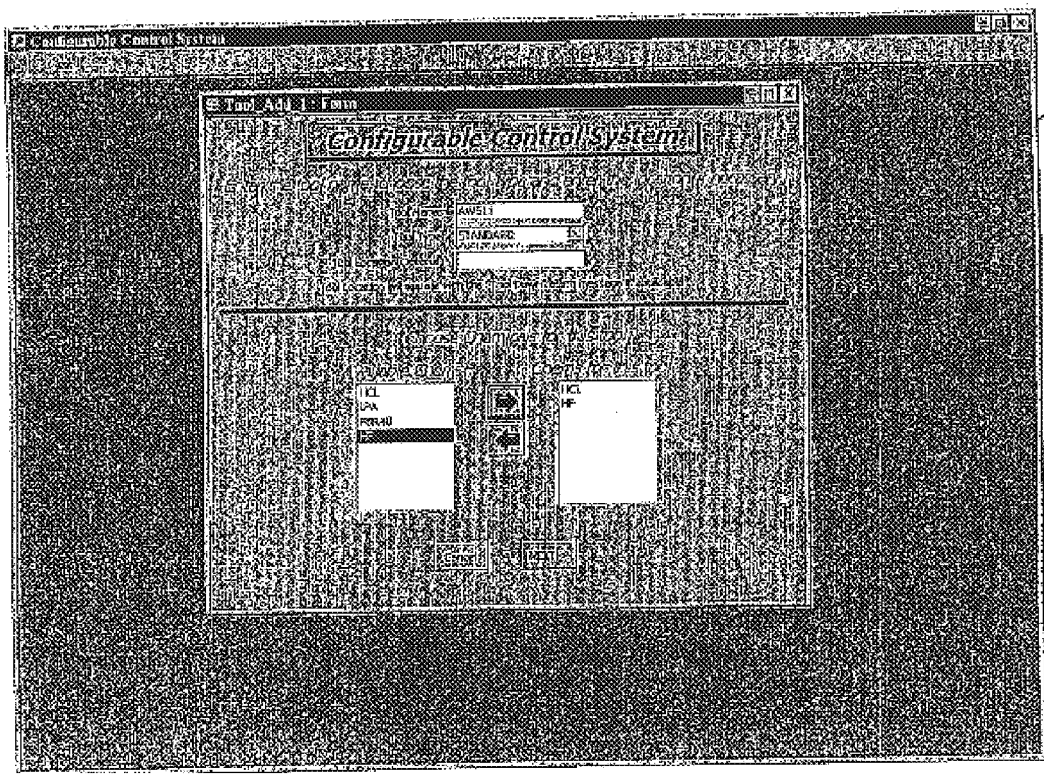
FIGS. 13 through 15 show screen images illustrating the ease with which a user can implement the invention, add a tool, and select chemicals in configuring the illustrative chemical processing system.
Figure 14:
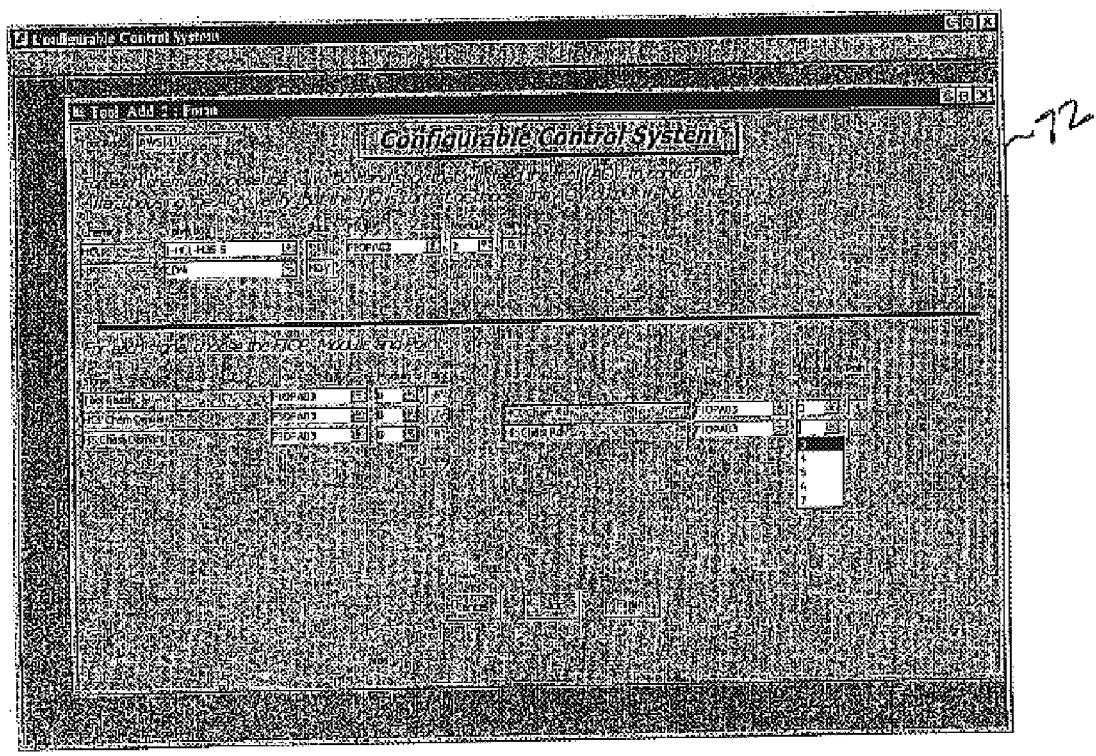
Figure 15:
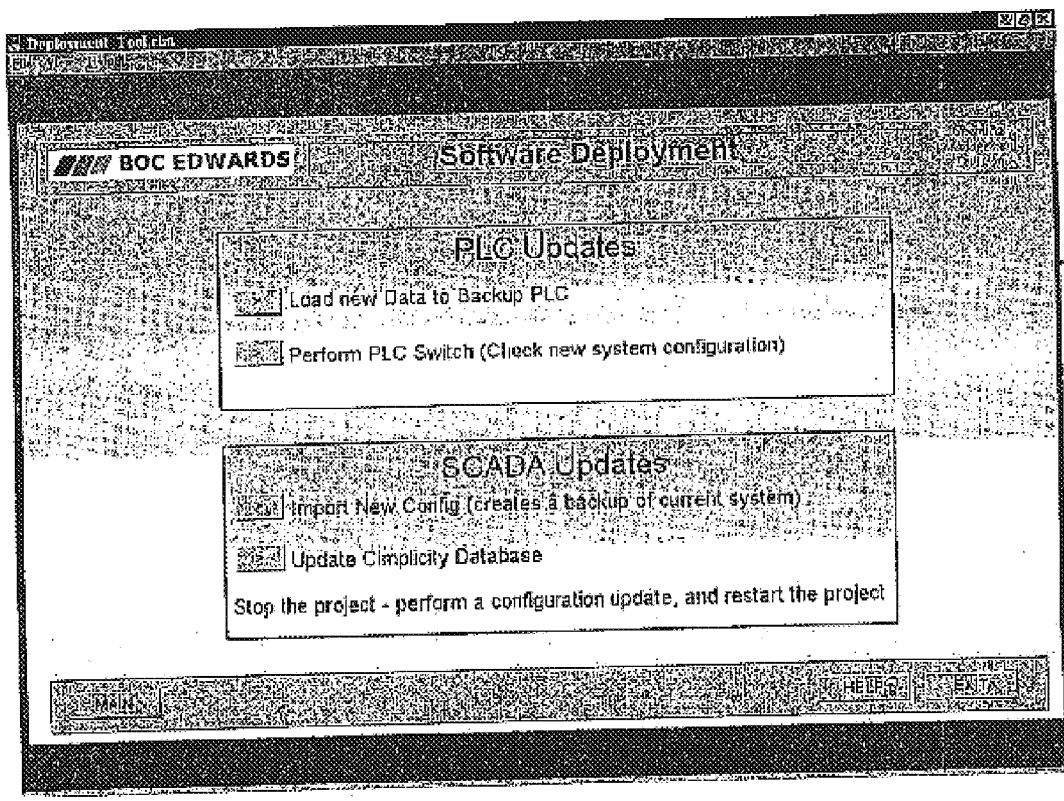

Subsequent to configuring the illustrative chemical system, a user may wish to change some process flow path, or other aspect of the configuration. The flowchart of FIG. 12 shows steps 50 through 62 for permitting a user to easily make a desired change in the illustrative chemical system. Steps 50 through 62 demand very little of the user, as will be shown. For example, to make a change in the illustrated chemical system, a user addresses the main menu 32 of FIG. 4 for in this example pulling up the screen image 70 (see FIG. 13) for "Tool Add 1: Form," after the user types in the appropriate tool name, uses the pull-down menu to insert the Tool Type, and may optionally include the tool location. As previously described, the user pushes on the appropriate ones of the arrows for selecting chemicals for the indicated tool. Following this, the user presses Next. The CCS responds by presenting the screen image 72 (see FIG. 14) for "Tool Add 2: Form." The user then addresses the various pull-down menus of the data field shown for assigning IO where required, followed by pressing Finish. The CCS responds by bringing up screen image 74 for "Deployment Tool.CIM, as shown in FIG. 15. The user simply employs a computer mouse for addressing the desired toggle buttons to deploy the changes previously made.

The present human/machine interface has been partially illustrated above in association with FIGS. 4 through 15. In the example of the present chemical processing system, the illustrated use of a main select screen with associated pull down menus, and associated other screen images with appropriate pull down menus and data fields for entry of data, are utilized to permit a user to easily configure and control the associated manufacturing process system. For example, in the illustrated chemical system, the illustrated screen images can be developed in the present invention for facilitating many different functions. These functions can include adding or deleting a tool, adding or deleting a chemical to and from a tool, respectively, renaming a tool, adding or deleting a valve box, adding or deleting a FIOP (Field IO Panel), adding or deleting a tool type, adding or deleting a valve box type, adding or deleting an auxiliary signal, adding or deleting an FMS (Factory Monitoring System), adding or deleting a CDM (Chemical Distribution Module) and so forth. In this manner, a user can rapidly configure or reconfigure a manufacturing process system, without requiring software modifications, through use of the present invention.

The configuration tool 2 as illustrated for use in a chemical processing system permits a user to add, edit, and delete system objects. These objects may include chemical rooms, dispenser or blender systems, valve boxes, points of use and auxiliary signals. Also, it permits the user to configure signal locations using an IO Anywhere system, for placing system IO signals in any point in the control system to provide flexibility, and limit construction and hardware costs. Also, it permits the user to configure signals required for each system component, such as defining a valve box as having a specific number of leak sensors. Also, it provides the user the capability to configure system operational logic, such as the signals required for activating tools, and supply valves, for example. Also, it permits the user to configure safety logic based on the particular requirements of the process system, such as the isolation or shutdown protocol in the event of a valve box leak.

Figure 16:
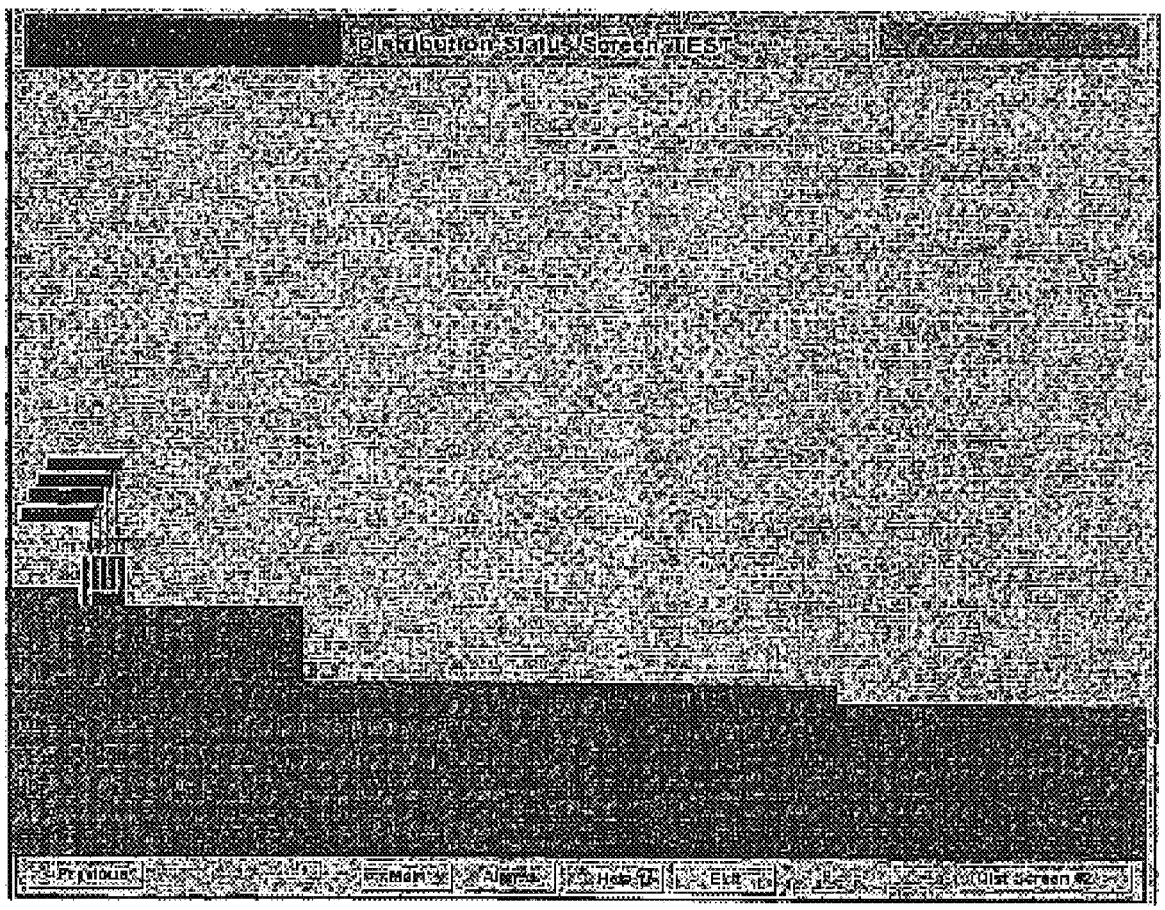
FIGS. 16 through 20 show screen images illustrating the ease with which a user can implement the invention to delete a tool.

FIGS. 16 through 20 illustrate the process of making a change to the Configurable Control System for deleting a tool, in this example. FIG. 16 shows the SCADA Distribution Status screen located on the PC. The CDM in FIG. 16 indicates that four tools (T1, T2, T3 and T4) are initially connected to the CDM.

Figure 17:
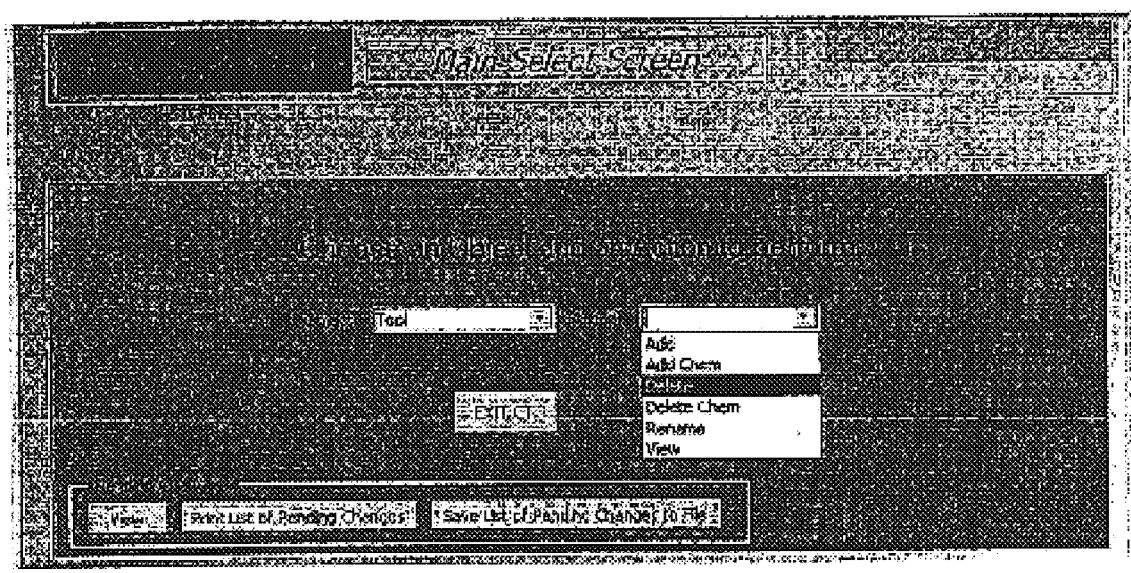

If the user decides to modify the manufacturing equipment by eliminating a Tool from the manufacturing process, the user must begin at the Configuration Tool's Main Select Screen shown in FIG. 17. Using the pull down menus, the user selects Tool and Delete, and then selects "Next" to continue as shown in FIG. 18.

Figure 18:

The next screen that appears is the Tool-Delete screen shown in FIG. 18. Using the pull down menu, the user selects the Tool to be deleted. In this example, the user selects Tool 4 (T4) for deletion from the Configurable Control System. The user then presses Finish to implement the updates to the Configuration Databases.

Figure 19:
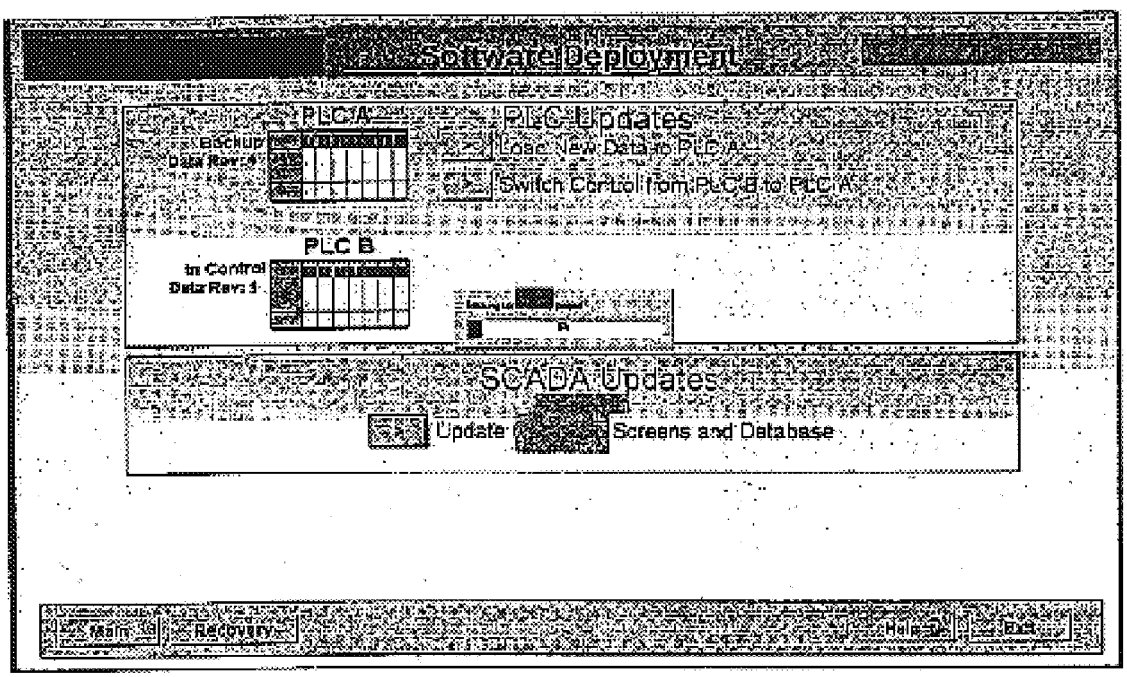

Next, the user accesses the Deployment Tool from the SCADA Application. In the Deployment Tool Screen (FIG. 19), the user downloads new data to the PLCs 8A, 8B, and updates the SCADA display and database of CMS server 1. In an optimal configuration, there will be two, redundant PLCs 8A, 8B, as shown in FIG. 2. Therefore, the user can download new data to PLC 8A while PLC 8B is controlling the manufacturing process. Once PLC 8A is updated, the user switches control to PLC 8A, then updates PLC 8B. The user also updates the SCADA display and database by pressing the corresponding button as shown in FIG. 19.

Figure 20:
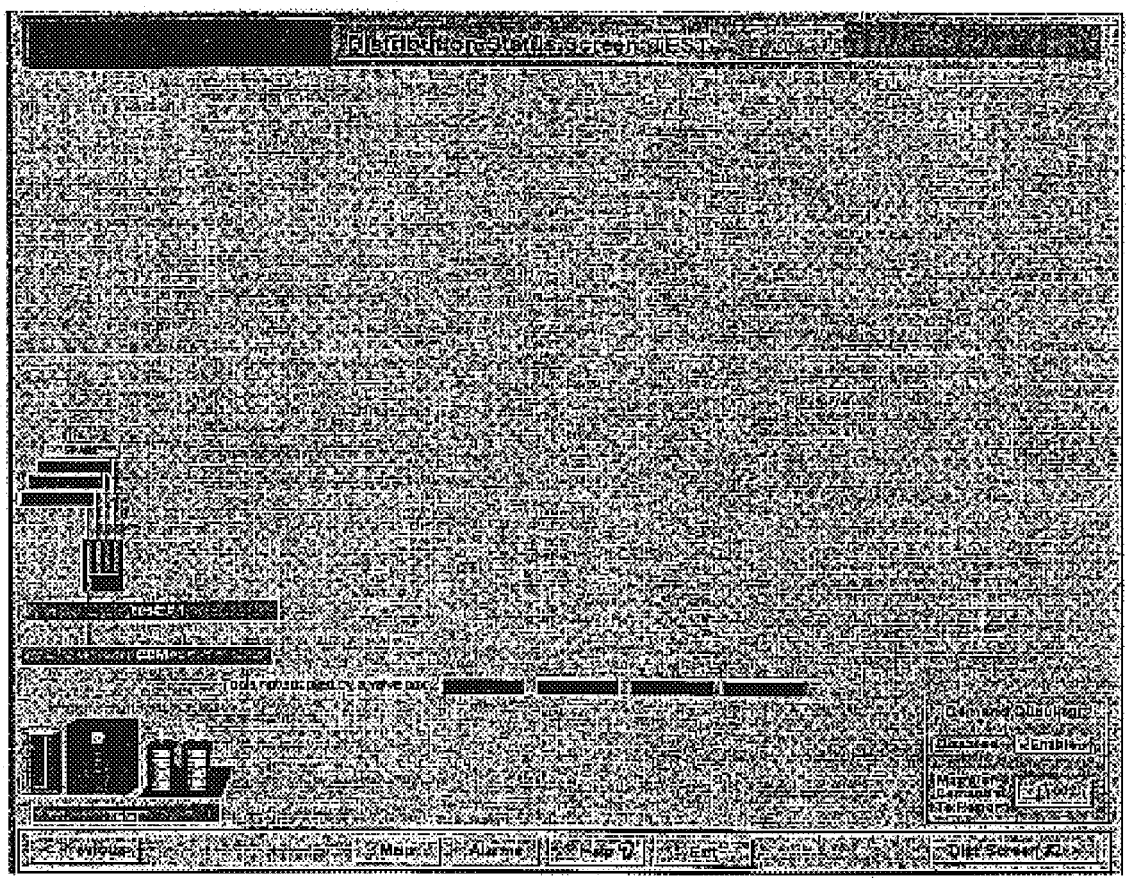

FIG. 20 shows the updated SCADA Distribution SCADA Screen. As expected, T4 is deleted and the connection is now a spare to the CDM.

In summary, with further reference to FIGS. 1 and 2, the CCS is composed of a plurality of components, that combined create a user configurable Man Machine Interface and process control of the illustrated Chemical Distribution System 13. Also required, as shown in FIG. 2, Ethernet Communications is provided between PLC 8 and PC included in CMS server 1, in this example. The basic concept of the system is to create a configuration of the control of the chemical distribution system and store the configuration in Configuration Databases 4. Information stored in the databases 4 is placed there in a very structured and unique format. The database 4 is segregated into the PLC database 10 and the SCADA database 5. The PLC database 10 contains tables laid out in a manner to match the memory arrays laid out in the PLC 8. As the CCS is configured, these database tables are populated with Input/Output point location and or/that the logic for this particular logic table is enabled and an index number for how many times the logic should be performed. Other information such as timer presets are also stored in tables that match the memory arrays in the PLC 8. The PLC application software 9 is designed around a maximum build of the configurable control system (the largest number of distributed input/output points) and the maximum build of objects to be controlled (points of use, valve box leak points). By assigning a unique number to each possible i/o point in the PLC 8 control system, the PLC database 10 becomes a match for the logic arrays in the PLC application software 9. To update the logic to the PLC 8, the download tool 7 using RSLinx and DDE commands, moves information from each array in the PLC Database 10 array into the PLC application program 9, one after the other, and populates the PLC application program logic array with the information stored in the database 10. The Download Tool 7 loads the logic array to the offline PLC 8A, for example, and when the logic is to become active, the control of the distributed I/O in the system is switched from the active PLC 8A to the backup PLC 8B, and the new control logic takes over, as previously mentioned. The once active PLC 8A is now backup and information is loaded to this PLC 8A via the download tool 7.

Configuration Download Arrays: CDA's are 2-dimensional double integer arrays "DINT'S" that contain the reference location of the real world input, output, and internal variables stored in a Main Bit Array. The CDA's use the reference location to look up the state of the input or output or internal bit of the Main Bit Array and then use the state, either low "0" or high "1" to perform logic. Configuration Download arrays are 2-dimensional but with varying lengths depending upon the logic that must be performed to determine the desired result. The design of a CDA is 2-dimension DINT Array which has a primary dimension index and a secondary dimension index. The primary index is used in the Data Concentrator Logic as the index in a For/Next Loop instruction. The secondary dimension index contains the reference location of the input or output or internal bit from the Main Bit array. The primary dimension will be referred to as "index" and the secondary dimension will be known as the coefficient.

Example: Config. Download Array

| Temp | 0 | 1 | 2 |
|---|---|---|---|
| Not Selected | 1 | 0 | 7900 |
| Index | coefficient0 | coefficient1 | coefficient2 |
| 1 | | | |
| 2 | | | |
| 3 | | | |
| Max number | | | |

Temp0: Temp0 is the local variable name used in the Data Concentrator PLC 8 logic that references coefficent0 in the Configuration Download Array. Temp#'s range from 0 on up to 150 for some CDA's. Temp Row in the CDA example has the Temp# for each column or coefficient used in the logic. The coefficient 0 . . . 150 contains the location of the real world input or output.

Not Selected: is the reference location in the MA.Bit array that the Configuration Tool stores in the coefficient where the coefficient in the logic is not selected or required or used. If the coefficient reference location is 0, then the state at location 0 in the MA.Bit array is always 0. If the coefficient location is 1, then the state at location 1 in the MA.Bit array is always 1. A Coefficient value of 7900 is the reference location of a "trash output" that will never be examined. Since the logic is different for each type of CDA, the not selected row shows the coefficient value that should be used to "Not select" the option. The placement of 0 or 1 or 7900 into the CDA is determined by the Configuration Tool software.

Along similar lines, the SCADA Application Software 11also uses predefined database tables that are populated with configuration data of the SCADA application. Since both the SCADA application software 11 and the Configuration Tool Application software and the Configuration Database 4 reside on a Personal Computer 9 (not shown), the SCADA application 11 directly access the database 4 to create objects and animation for viewing process operation. The only need for the Download Tool is to update the SCADA tag database.

The SCADA application 11 is centered upon a linked series of viewable screens, pre-populated with the maximum number of objects. The objects on the SCADA screens remain in an off state unless the Configuration Tool software animates them. The enabling of the object and the creation of the object tag is derived from the Configuration Tool database 4. Each time a linked screen is opened, the SCADA application software 11 gathers its animation data from the Configuration Database 4 and activates the objects on the screen of the computer monitor (not shown). The SCADA tags are a set of addresses for I/O points that reside in the PLC 8. The SCADA software uses RSLinx or other communication OPC drivers to communicate to the PLC and determine the status of the SCADA tag. Animation then occurs based upon the state of the tag. For instance, if the user defined a leak i/o point of a valve box. Based upon the location of the screen on where the valve box should occur, the SCADA application using the Configuration database creates an tag containing the i/o point address, assigns it to animate the SCADA object for a valve box leak point, communicates via RSLinx on the state of the tag (either on or off) and animates it accordingly. This is done for all the objects associated with the screen.

As shown above, the Configurable Control System of the present invention permits a user to easily configure, and make changes to a manufacturing process system, without requiring a programmer to change the software. The CCS permits a user to readily add to, delete from, rename, view, or create Objects in the associated manufacturing process system. The effect of the present invention is to provide a user with a "plug and play" environment for the user's manufacturing process.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

1. A configurable control system (CCS) for a manufacturing process system, for providing a user the ability to rapidly configure or reconfigure the associated processing system without the use of programming tools, the CCS comprising:

configuration tool means for permitting a user to rapidly define the physical, logical, and control configuration for the associated processing system, said configuration tool including means for generating a configuration database file for the processing system configuration as implemented by a user at a given time;

supervisory control and data acquisition means (SCADA) for automatically receiving data from said configuration database file, and operating to deploy the processing system configuration, deploy changes to the processing system configuration at any given time, and to automatically generate and change a man machine interface (MMI); and programmable logic controller means for automatically processing data from said configuration database file to assign input/output (IO) and logic based upon the desired system configuration at any given time.

2. The CCS of claim 1, wherein said configuration tool means includes:

form based graphical user interface (GUI) software for providing screen images with pull-down menus to facilitate a user's ability to configure and make changes to the associated processing system.

3. The CCS of claim 2, wherein said SCADA means includes:

a deployment tool for automatically generating graphics and alarms for display based on the system defined by said configuration tool.

4. The CCS of claim 3, wherein said SCADA means further includes:

monitoring means for monitoring the status of the associated manufacturing process system.

5. The CCS of claim 4, wherein said monitoring means consists of a GE Cimplicity-based SCADA software application.

6. The CCS of claim 2, wherein said programmable logic controller means includes redundant programmable logic controllers for maximizing the uptime for the associated manufacturing process system.

7. The CCS of claim 3, wherein said deployment tool consists of a GE Cimplicity-based SCADA software application.

8. The CCS of claim 1, wherein said configuration tool means includes:
   means for permitting a user to add, edit, and delete system objects.

9. The CCS of claim 1, wherein said configuration tool means includes:
   means for permitting a user to configure signal locations to place IO signals at required locations in said control system.

10. The CCS of claim 1, wherein said configuration tool means includes:
    means for permitting a user to configure signals required for each object.

11. The CCS of claim 1, wherein said configuration tool means includes:
    means for permitting a user to configure system operational logic.

12. The CCS of claim 1, wherein said configuration tool means includes:
    means for permitting a user to configure safety logic.

13. The CCS of claim 1, wherein said configuration tool means includes:
    means for permitting a user to add, edit, and delete system objects;
    means for permitting a user to configure signal locations to place IO signals at required locations in said control system;
    means for permitting a user to configure signals required for each object;
    means for permitting a user to configure system operational logic; and
    means for permitting a user to configure safety logic.

14. The CCS of claim 1, wherein said programmable logic controller means includes an Allen-Bradley based software application.

15. A method for providing a configurable control system (CCS) to permit a user to rapidly configure and/or change a manufacturing process system through use of non-programmable tools, said method comprising the steps of:
    providing a graphical user interface including a plurality of menu driven screen images, for permitting a user to initially configure the processing system;
    receiving in a configuration tool initialization data inputted by a user via selected ones of said plurality of screen images;
    automatically operating said configuration tool to produce a database file containing the configuration for said processing system received from said user;
    automatically transferring data from said data file to a supervisory control and data acquisition application (SCADA);
    automatically operating said SCADA to deploy changes and generate graphics and alarms based upon the processing system as defined by configuration data; and
    automatically transferring data from said data file to a programmable logic controller (PLC) application, which responds thereto by automatically assigning input/output IO signals to components to enable logic based upon the present configuration data.

16. The method of claim 15, further including the steps of:
    providing via said graphical user interface a plurality of menu driven screen images for permitting a user to make changes in the configuration of the processing system;
    receiving in said configuration tool data inputted by the user for changing the configuration of the processing system;
    automatically operating said configuration tool to change the database file to the new configuration for said processing system;
    automatically transferring data from said data file to said SCADA;
    automatically operating said SCADA to deploy the changes and generate graphical and alarms based upon the new configuration data; and
    automatically transferring the modified configuration data from said data file to said PLC application, which responds by automatically assigning input/output IO signals to components to enable logic based upon the modified configuration data.

17. The method of claim 15, wherein said step of providing a graphical user interface further includes the step of:
    permitting a user to add, edit, and delete system objects.

18. The method of claim 15, wherein said step of providing a graphical user interface further includes the step of:
    permitting a user to configure signal locations to place IO signals at required locations in said control system.

19. The method of claim 15, wherein said step of providing a graphical user interface further includes the step of:
    permitting a user to configure signals required for each object.

20. The method of claim 15, wherein said step of providing a graphical user interface further includes the step of:
    permitting a user to configure system operational logic; and
    permitting a user to configure safety logic.

* * * * *